US012625829B2

(12) United States Patent
Wake

(10) Patent No.: US 12,625,829 B2
(45) Date of Patent: May 12, 2026

(54) CONTROLLER, SETTING METHOD, AND SETTING PROGRAM

(71) Applicant: Yokogawa Electric Corporation, Tokyo (JP)

(72) Inventor: Ichiro Wake, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 18/743,821

(22) Filed: Jun. 14, 2024

(65) Prior Publication Data

US 2025/0004960 A1 Jan. 2, 2025

(30) Foreign Application Priority Data

Jun. 29, 2023 (JP) ................................. 2023-107278

(51) Int. Cl.
| | |
|---|---|
| *G06F 13/20* | (2006.01) |
| *G05B 19/04* | (2006.01) |
| *G05B 19/042* | (2006.01) |
| *G05B 19/05* | (2006.01) |
| *G06F 21/44* | (2013.01) |

(52) U.S. Cl.
CPC .............. *G06F 13/20* (2013.01); *G06F 21/44* (2013.01); *G06F 2213/40* (2013.01)

(58) Field of Classification Search
CPC ............................ H04L 29/06; H04L 61/3015
See application file for complete search history.

(56) References Cited

U.S. PATENT DOCUMENTS

| | | | |
|---|---|---|---|
| 2015/0066979 A1 | 3/2015 | Zhang et al. | |
| 2015/0193327 A1* | 7/2015 | Christianson | ....... G06F 11/0709 |
| | | | 714/37 |
| 2016/0370787 A1* | 12/2016 | Hashimoto | ........ G05B 19/4183 |
| 2017/0085566 A1* | 3/2017 | Kim | .................... H04L 63/0876 |
| 2018/0157856 A1* | 6/2018 | Otsuka | ............... G06F 21/6209 |
| 2019/0077368 A1* | 3/2019 | Hwang | .................. B60R 25/24 |
| 2019/0377310 A1 | 12/2019 | Macha et al. | |

(Continued)

FOREIGN PATENT DOCUMENTS

| | | |
|---|---|---|
| JP | 2014174765 A | 9/2014 |
| JP | 2022046438 A | 3/2022 |

OTHER PUBLICATIONS

Extended European Search Report (EESR) dated Dec. 6, 2024 issued in European patent application No. 24183129.6.

(Continued)

*Primary Examiner* — Getente A Yimer
(74) *Attorney, Agent, or Firm* — RANKIN, HILL & CLARK LLP

(57) ABSTRACT

A controller includes a receiver that receives specification of identification information representing a number that identifies a relay device that is connected to a plurality of instruments or a number that identifies a cable that connects the relay device and the controller; a search unit that searches an instrumentation database that records the identification information and input-output information on the instruments that are connected to the relay device in association with each other for input-output information corresponding to the specified identification information; and a setting unit that sets the searched input-output information in an input-output module of the controller.

8 Claims, 6 Drawing Sheets

(56)    References Cited

U.S. PATENT DOCUMENTS

| | | | |
|---|---|---|---|
| 2020/0004229 A1 | 1/2020 | Hosoya et al. | |
| 2022/0075352 A1 | 3/2022 | Nixon et al. | |
| 2022/0075354 A1 | 3/2022 | Nixon et al. | |
| 2022/0128976 A1 | 4/2022 | Nixon et al. | |
| 2023/0140750 A1* | 5/2023 | Hamamoto | H04L 61/5038 |
| | | | 709/223 |
| 2024/0273001 A1* | 8/2024 | Eda | G06F 11/1461 |

OTHER PUBLICATIONS

Japanese Office Action dated Feb. 3, 2026 and issued for Japanese patent application No. 2023-107278 and its English machine translation.

* cited by examiner

| ITEM NUM-BER | JB NUM-BER | JB TERMINAL NUMBER | HR CABLE NUMBER | CABLE CORE NUMBER | IO INFORMATION | DCN SETTING INFORMATION | CONTROL PARAMETER | ALARM THRESHOLD |
|---|---|---|---|---|---|---|---|---|
| (1) | JB-001 | 1/2 | CBL-001 | 1/2 | IO INFORMATION CORRESPONDING TO JB NUMBER "JB-001", JB TERMINAL NUMBER "1/2", HR CABLE NUMBER "CBL-001", AND CABLE CORE NUMBER "1/2" | | | |
| (2) | JB-001 | 3/4 | CBL-001 | 5/6 | IO INFORMATION CORRESPONDING TO JB NUMBER "JB-001", JB TERMINAL NUMBER "3/4", HR CABLE NUMBER "CBL-001", AND CABLE CORE NUMBER "5/6" | | | |
| (3) | JB-001 | 5/6 | CBL-001 | 9/10 | IO INFORMATION CORRESPONDING TO JB NUMBER "JB-001", JB TERMINAL NUMBER "5/6", HR CABLE NUMBER "CBL-001", AND CABLE CORE NUMBER "9/10" | SETTING INFORMATION IN DCN CONNECTED TO JUNCTION BOX (INFORMATION ON IO ASSIGNMENT) | CONTROL PARAMETER SET IN FUNCTION BLOCK | THRESHOLD SET IN FUNCTION BLOCK |
| (4) | JB-001 | 7/8 | CBL-001 | 13/14 | IO INFORMATION CORRESPONDING TO JB NUMBER "JB-001", JB TERMINAL NUMBER "7/8", HR CABLE NUMBER "CBL-001", AND CABLE CORE NUMBER "13/14" | | | |
| (5) | JB-002 | 1/2 | CBL-002 | 1/2 | IO INFORMATION CORRESPONDING TO JB NUMBER "JB-002", JB TERMINAL NUMBER "1/2", HR CABLE NUMBER "CBL-002", AND CABLE CORE NUMBER "1/2" | | | |
| (6) | JB-002 | 3/4 | CBL-002 | 5/6 | IO INFORMATION CORRESPONDING TO JB NUMBER "JB-002", JB TERMINAL NUMBER "3/4", HR CABLE NUMBER "CBL-002", AND CABLE CORE NUMBER "5/6" | | | |
| ... | ... | ... | ... | ... | ... | | | |

FIG.5

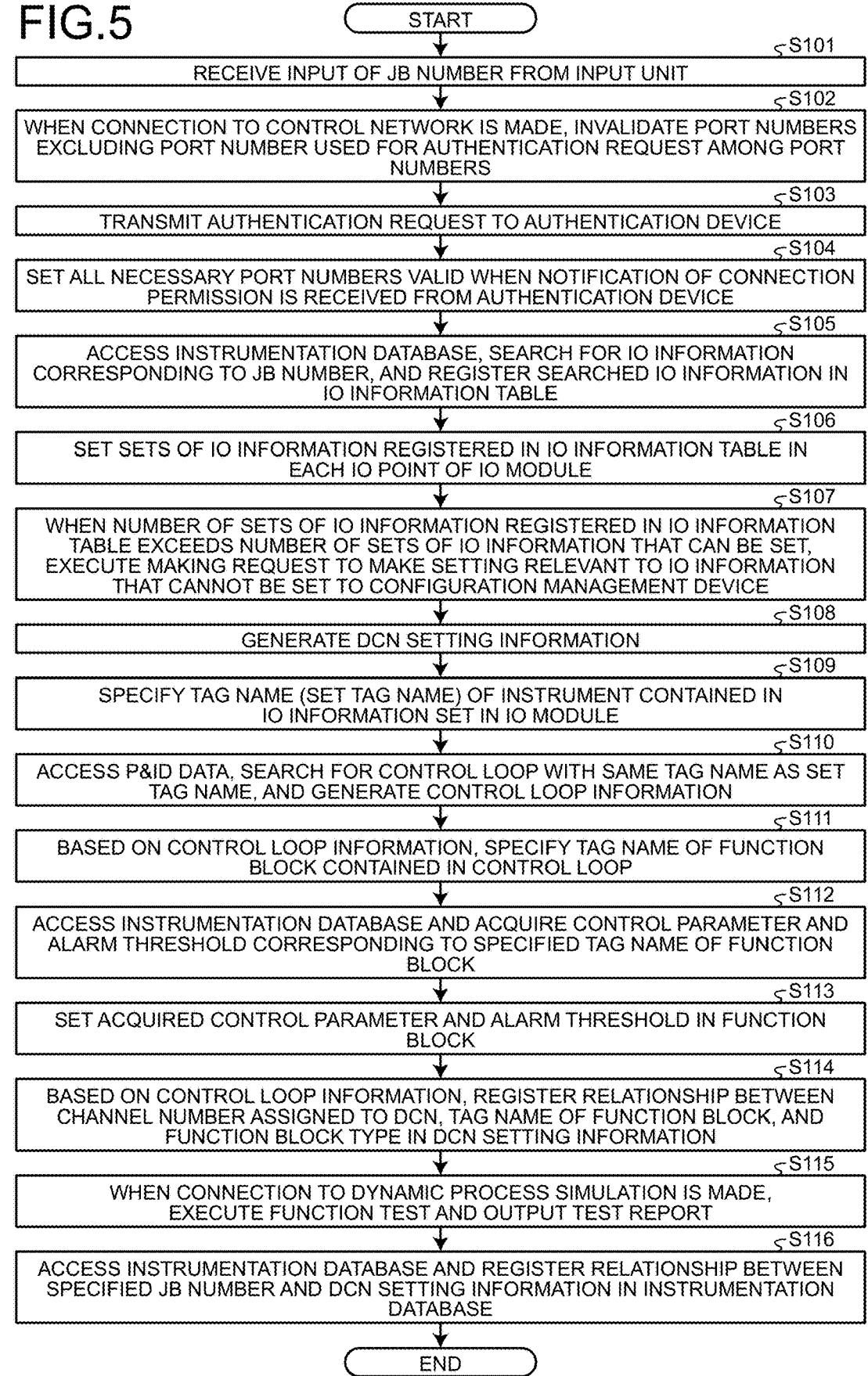

START

S101
RECEIVE INPUT OF JB NUMBER FROM INPUT UNIT

S102
WHEN CONNECTION TO CONTROL NETWORK IS MADE, INVALIDATE PORT NUMBERS EXCLUDING PORT NUMBER USED FOR AUTHENTICATION REQUEST AMONG PORT NUMBERS

S103
TRANSMIT AUTHENTICATION REQUEST TO AUTHENTICATION DEVICE

S104
SET ALL NECESSARY PORT NUMBERS VALID WHEN NOTIFICATION OF CONNECTION PERMISSION IS RECEIVED FROM AUTHENTICATION DEVICE

S105
ACCESS INSTRUMENTATION DATABASE, SEARCH FOR IO INFORMATION CORRESPONDING TO JB NUMBER, AND REGISTER SEARCHED IO INFORMATION IN IO INFORMATION TABLE

S106
SET SETS OF IO INFORMATION REGISTERED IN IO INFORMATION TABLE IN EACH IO POINT OF IO MODULE

S107
WHEN NUMBER OF SETS OF IO INFORMATION REGISTERED IN IO INFORMATION TABLE EXCEEDS NUMBER OF SETS OF IO INFORMATION THAT CAN BE SET, EXECUTE MAKING REQUEST TO MAKE SETTING RELEVANT TO IO INFORMATION THAT CANNOT BE SET TO CONFIGURATION MANAGEMENT DEVICE

S108
GENERATE DCN SETTING INFORMATION

S109
SPECIFY TAG NAME (SET TAG NAME) OF INSTRUMENT CONTAINED IN IO INFORMATION SET IN IO MODULE

S110
ACCESS P&ID DATA, SEARCH FOR CONTROL LOOP WITH SAME TAG NAME AS SET TAG NAME, AND GENERATE CONTROL LOOP INFORMATION

S111
BASED ON CONTROL LOOP INFORMATION, SPECIFY TAG NAME OF FUNCTION BLOCK CONTAINED IN CONTROL LOOP

S112
ACCESS INSTRUMENTATION DATABASE AND ACQUIRE CONTROL PARAMETER AND ALARM THRESHOLD CORRESPONDING TO SPECIFIED TAG NAME OF FUNCTION BLOCK

S113
SET ACQUIRED CONTROL PARAMETER AND ALARM THRESHOLD IN FUNCTION BLOCK

S114
BASED ON CONTROL LOOP INFORMATION, REGISTER RELATIONSHIP BETWEEN CHANNEL NUMBER ASSIGNED TO DCN, TAG NAME OF FUNCTION BLOCK, AND FUNCTION BLOCK TYPE IN DCN SETTING INFORMATION

S115
WHEN CONNECTION TO DYNAMIC PROCESS SIMULATION IS MADE, EXECUTE FUNCTION TEST AND OUTPUT TEST REPORT

S116
ACCESS INSTRUMENTATION DATABASE AND REGISTER RELATIONSHIP BETWEEN SPECIFIED JB NUMBER AND DCN SETTING INFORMATION IN INSTRUMENTATION DATABASE

END

1

CONTROLLER, SETTING METHOD, AND SETTING PROGRAM

CROSS-REFERENCE TO RELATED APPLICATION

The present application claims priority to and incorporates by reference the entire contents of Japanese Patent Application No. 2023-107278 filed in Japan on Jun. 29, 2023.

FIELD

The present disclosure relates to a controller, a setting method, and a setting program.

BACKGROUND

Processes for manufacturing various types of products are automated by introducing an automation system to a plant. When a project relevant to the automation system is carried out, engineering, such as designing, construction, and examination, are performed based on designing information that is received from a customer.

Patent Literature 1: Japanese Laid-open Patent Publication No. 2022-046438

It is however has not been possible to perform engineering on automation systems efficiently.

In one aspect, an object is to provide a controller, a setting method, and a setting program that make it possible to perform engineering on an automation system efficiently.

SUMMARY

It is an object of the present invention to at least partially solve the problems in the conventional technology.

According to an aspect of an embodiment, a controller includes a receiver that receives specification of identification information representing a number that identifies a relay device that is connected to a plurality of instruments or a number that identifies a cable that connects the relay device and the controller a search unit that searches an instrumentation database that records the identification information and input-output information on the instruments that are connected to the relay device in association with each other for input-output information corresponding to the specified identification information; and a setting unit that sets the searched input-output information in an input-output module of the controller.

BRIEF DESCRIPTION OF THE DRAWINGS

FIG. 1 is a diagram illustrating a system configuration according to an embodiment;

FIG. 2 is a diagram illustrating an example of a data structure of an instrumentation database;

FIG. 5 is a flowchart illustrating a flow of a process of a DCN of the embodiment;

2

DETAILED OF EMBODIMENTS

An embodiment of a controller, a setting method, and a setting program disclosed by the present application will be described in detail below according to the drawings. Note that the embodiment does not limit the disclosure. The same number is assigned to the same elements, redundant description will be omitted as appropriate, and embodiments can be combined as appropriate within a range without inconsistency.

Figure 7:
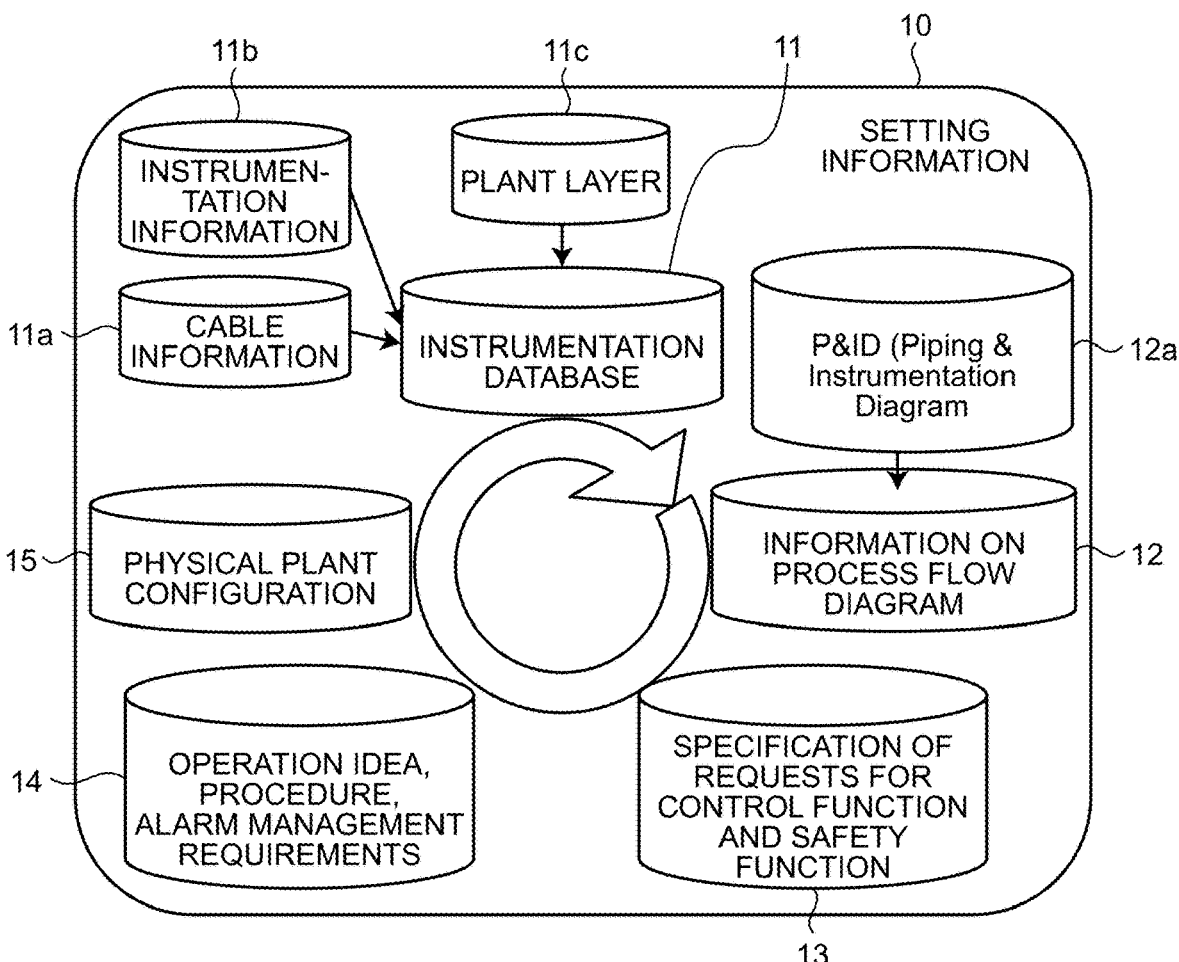
FIG. 7 is a diagram illustrating an example of setting information that is received from a customer.

FIG. 7 is a diagram illustrating an example of setting information that is received from a customer. As illustrated in FIG. 7, for example, setting information 10 contains an instrumentation database 11, information 12 on a process flow diagram, a specification 13 of requests for a control function and a safety function, operation idea, procedure, and alarm management requirements 14, and a physical plant configuration 15. The instrumentation database 11 includes cable information 11a, instrumentation information 11b, and plant layers 11c. The information 12 in the process flow diagram contains a P&ID (Piping & Instrumentation Diagram) 12a.

In a conventional method, when engineering is performed based on the setting information 10, there is a work that is performed manually by a worker. For example, a worker refers to the instrumentation database 11 and makes input output (IO) settings in a plurality of controllers (distributed control nodes (DCNs) below) that configure an automation system and builds a control loop of a function block that leads to IO.

As described above, in the conventional method, when engineering is performed based on the designing information, a worker manually makes a setting for the DCNs and it is not possible to carry out a project on the automation system efficiently.

When a change in the setting information 10 occurs, the worker refers to the instrumentation database 11 each time and makes resetting on the DCNs and thus the load on the worker increases. The embodiment will be described below.

Entire Configuration

Figure 1:
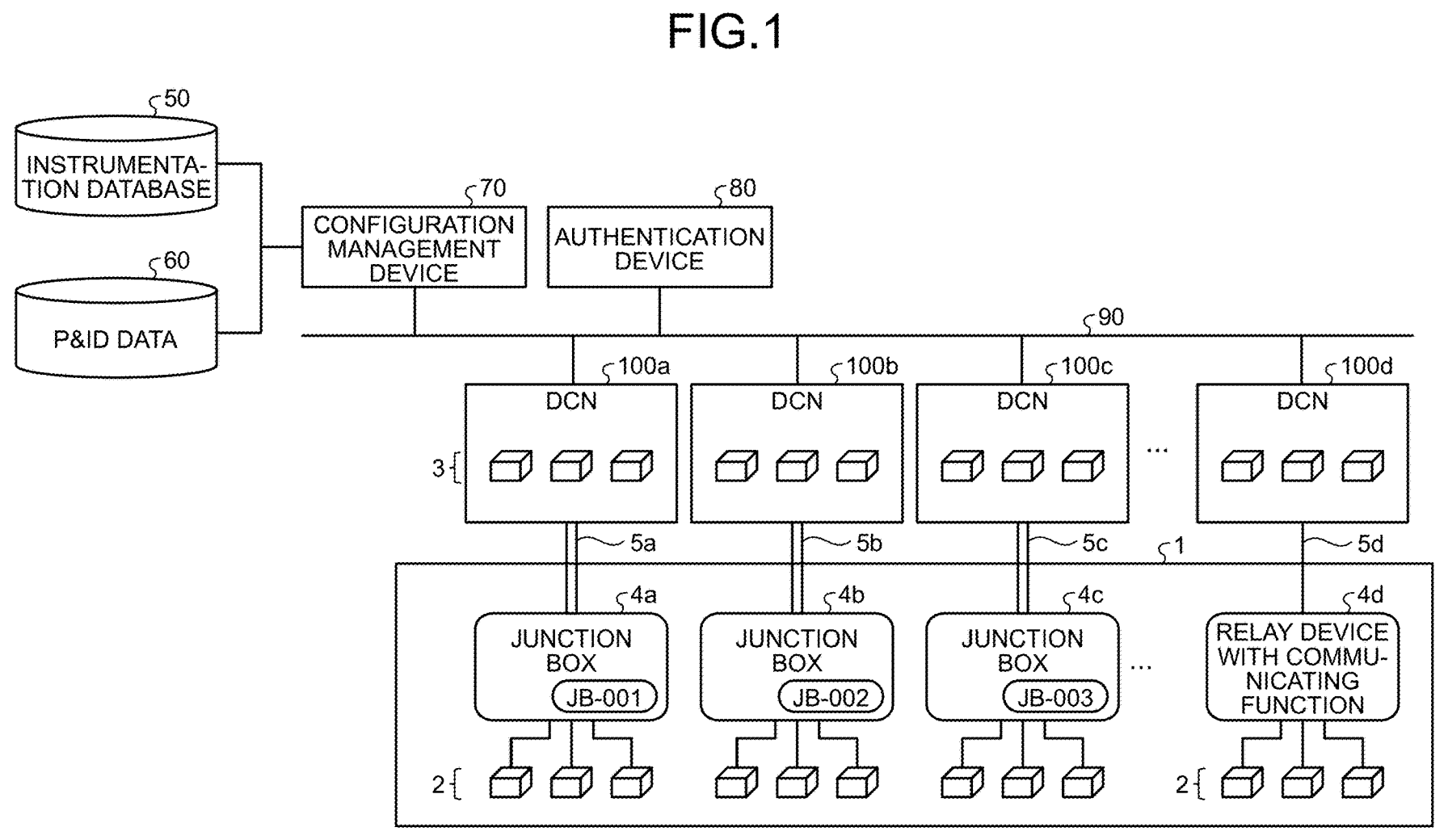

An example of a system configuration according to the embodiment will be described. FIG. 1 is a diagram illustrating the system configuration of the embodiment. As illustrated in FIG. 1, the system includes a plant 1, an instrumentation database 50, P&ID data 60, a configuration management device 70, an authentication device 80, DCNs 100a, 100b and 100c. Although illustration in the drawings is omitted, the system may further include another DCN in addition to the DCNs 100a to 100c (for example, may further include a DCN 100d). The configuration management device 70 and the authentication device 80 may be realized using a single device.

The configuration management device 70, the authentication device 80, and the DCNs 100a to 100c are mutually connected via a control network 90. The configuration management device 70 is connected to the instrumentation database 50 and the P&ID data 60.

The plant is an oil, petrifaction, gas, ferrous or non-ferrous, chemical, power, or food and medicine production facility.

A plurality of instruments 2 are set in various spots in the plant 1. The instruments 2 are connected to field instruments, such as a pressure sensor, a temperature sensor, a flow sensor, a pH sensor, a speed sensor, an acceleration sensor, a valve, a pump, and a motor in the plant 1. The instruments 2 are also connected to junction boxes 4a, 4b and 4c.

A function block 3 is built in a DCN and controls the instruments 2. For example, a flow in which the function block 3 acquires information from a certain instrument 2 and, based on the acquired information, controls another instrument 2 is referred to as a control loop.

The junction boxes 4a to 4c are connected to the DCNs 100a to 100c, respectively, with multicore home run cables 5a, 5b and 5c. Although not illustrated in the drawings, the plant 1 may further include junction boxes in addition to the junction boxes 4a to 4c. The junction boxes 4a to 4c are an example of a "relay device". For example, when the instrument 2 has a communicating function, the instrument 2 may be connected to a relay device 4d having a communicating function, such as a network switch. In this case, the relay device 4d is connected to the DCN 100d via the communication cable 5d.

The junction boxes 4a to 4c connect electric cables, or the like, to the instruments 2. In the following description, the junction boxes 4a to 4c are referred to as "junction boxes 4" as appropriate. A junction box number (JB number below) for identifying a junction box is set in the junction box 4. In the example in FIG. 1, the JB number of the junction box 4a is "JB-001". The JB number of the junction box 4b is "JB-002". The JB number of the junction box 4c is "JB-003".

Note that the home run cables 5a to 5c are referred to as "home run cables 5" as appropriate. A home run cable number (HR cable number) that identifies the home run cable 5 is set in the home run cable 5.

The instrumentation database 50 associates a JB number, an HR cable number, and IO information. FIG. 2 is a diagram illustrating an example of a data structure of an instrumentation database. As illustrated in FIG. 2, the instrumentation database has item numbers, JB numbers, JB terminal numbers, HR cable numbers, cable core numbers, IO information, DCN setting information, control parameters, and alarm thresholds.

An item number is a number that identifies a record of the instrumentation database 50. An item number need not necessarily be contained in the instrumentation database 50.

A JB number is a number that identifies the junction box 4. A JB terminal number represents a terminal number that is connected to the instrument 2 in the terminal numbers on the side of the instrument 2 of the junction boxes 4. For example, a JB terminal number "½" represents a number 1 and a number 2.

A HR cable number is a number that identifies the home run cable 5. A cable core number is a core number of a cable that is used to connect a terminal of the junction box 4 on the side of the DCN and a terminal of the IO module of the DCN. For example, the cable core number "½" represents a number 1 and a number 2.

The IO information contains a tag name, an IO type, a signal type, an area of measurement, and a unit of industry. For example, the tag name is a tag name of the instrument 2 (device tag name). Any one of an "analog input (AI)", an "analog output (AO)", a "digital input (DI)" and a "digital output (DO)" is set for the IO type.

The signal type is a type of signal and "4-20 mA", "24 VCD (volts direct current)", or the like, is set. The area of measurement represents an area that is measurable by the instrument 2. For example, "0 to 300", or the like, is set for the area of measurement. A unit of industry, such as "T/hr", "%", or "PSIG", is set for the unit of industry.

The DCN setting information is information that is set in the DCNs that are connected to the junction box 4 and, as described below, notifications of the DCN setting information are made by the DCNs 100a to 100c. For example, the DCN setting information contains "DCN assignment", "IO channel assignment", "control system tag" and "function block type".

In DCN assignment, identification information of the DCN to which the corresponding JB number is assigned is set. In IO channel assignment, a channel number that is assigned to the IO module of the DCN is set. In a control system tag, a tag name of the function block 3 that relates to the control loop that is built in the DCN is set. A function block type is a type name of the function block 3.

The control parameters are various types of parameters that are set in the function block 3. An alarm threshold is a threshold that is referred to when the function block 3 outputs an alarm. For example, when a value that is output from the instrument 2 exceeds a threshold, the function block 3 outputs an alarm.

For example, by using the instrumentation database 50, the DCNs 100a to 100c are able to specify IO information corresponding to a JB number (or an HR cable number).

The P&ID data 60 is data in which schematizing and expressing various elements, such as the field instruments in the plant 1, the instruments 2 that are connected to the field instruments, the function blocks 3, and piping are schematized and are expressed.

Figure 3:
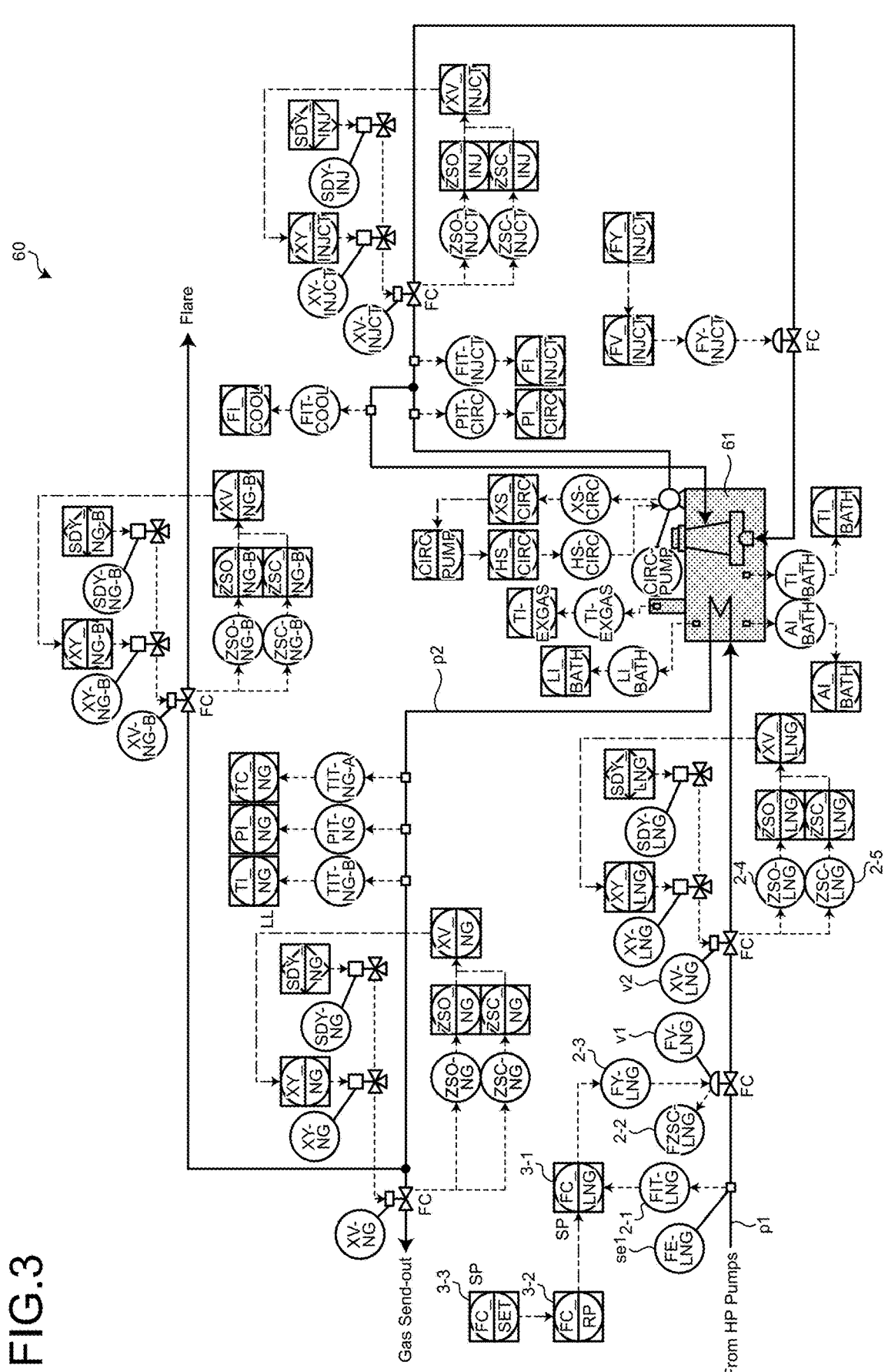
FIG. 3 is a diagram illustrating an example of a data structure of P&ID data.

FIG. 3 is a diagram illustrating an example of a data structure of the P&I data. Here, description relevant to part of the instruments, part of the function blocks, and part of piping that are contained in the P&ID data 60 will be given expediently. The junction box 4 described above are connected to the instruments 2.

A heat exchanger 61 is connected to piping p1, piping p2, etc. For example, liquefied natural gas (LNG) is transmitted via the piping p1. The heat exchanger 61 adds heat to the LNG, thereby returning the LNG to a gas. The heat exchanger 61 supplies the gas using the piping p2.

A sensor se1 for measuring the flow of the LNG is set in the piping p1. Valves v1 and v2 for adjusting the flow of the LNG are set in the piping p1. The sensor se1 is connected to an instrument 2-1. A valve v1 is connected to instruments 2-2 and 2-3. A valve v2 is connected to instruments 2-4 and 2-5.

Function blocks 3-1, 3-2 and 3-3 are built in the DCN. The function block 3-2 is connected to the function block 3-3. For example, the function block 3-1 acquires a measured value of the flow in the piping p1 from the instrument 2-1 and, according to the measured value, outputs control information on the valve v1 to the instrument 2-3. The instrument 2-3 adjusts the degree of opening or closing of the valve v1 based on control information. The function block executes such a process, thereby controlling the flow of the piping p1. A sequential process in which the function block 3-1 acquires information from the instrument 2-1 and, based on the acquired information, controls the instrument 2-3 is a control loop.

For example, the DCNs 100a to 100c use the P&ID data 60, thereby making it possible to specify a relationship of connection between the instruments 2 and the function blocks 3, and the control loop.

The configuration management device 70 manages the configuration of the system illustrated in FIG. 1. For example, the configuration management device 70 stores information that is set in the DCNs 100a to 100c that are connected to the control network 90. In response to requests from the DCNs 100a to 100c, the configuration management device 70 transmits information on the instrumentation database 50 and the P&ID data 60 to the DCNs 100a to 100c. Note that the DCNs 100a to 100c may directly access the instrumentation database 50 and the P&ID data 60 and acquire the information.

When a DCN is connected to the control network, the authentication device 80 authenticates the connected DCN. On receiving an authentication request from the DCN, in the case where the DCN that has made the authentication request is a DCN that is to be permitted for a connection, the authentication device 80 makes a notification of a connection permission. For example, information that identifies the DCN is set in the authentication request.

The DCNs 100a to 100c are connected to the instruments 2 via the home run cables 5 and the junction boxes 4 and execute data collection, monitoring, transmission of control commands, optimization of processes, etc. The DCNs 100a to 100c are collectively referred to as "DCNs 100" below.

The DCN 100 according to the embodiment receives a setting of a JB number from a worker and, when connected to the control network, searches for IO information corresponding to the JB number based on the instrumentation database 50 and the JB number and sets the searched IO information in the IO module of the DCN 100.

When the setting of the IO information completes, the DCN 100 searches for a control loop relevant to the instrument 2 that has a tag name of the set IO information based on the P&ID data 60 and builds the control loop in the DCN 100 by associating the tag name and the function block 3 relevant to the control loop. When the control loop is built, the DCN 100 sets a control parameter and an alarm threshold corresponding to the tag name of the function block 3 relevant to the control loop from the instrumentation database 50 in the function block 3.

As described above, the worker only sets a JB number in the DCN 100 and accordingly IO information is set in the IO module automatically and a control loop is built automatically, which makes it possible to eliminate the load due to engineering performed manually by the worker conventionally.

Functional Configuration

Figure 4:
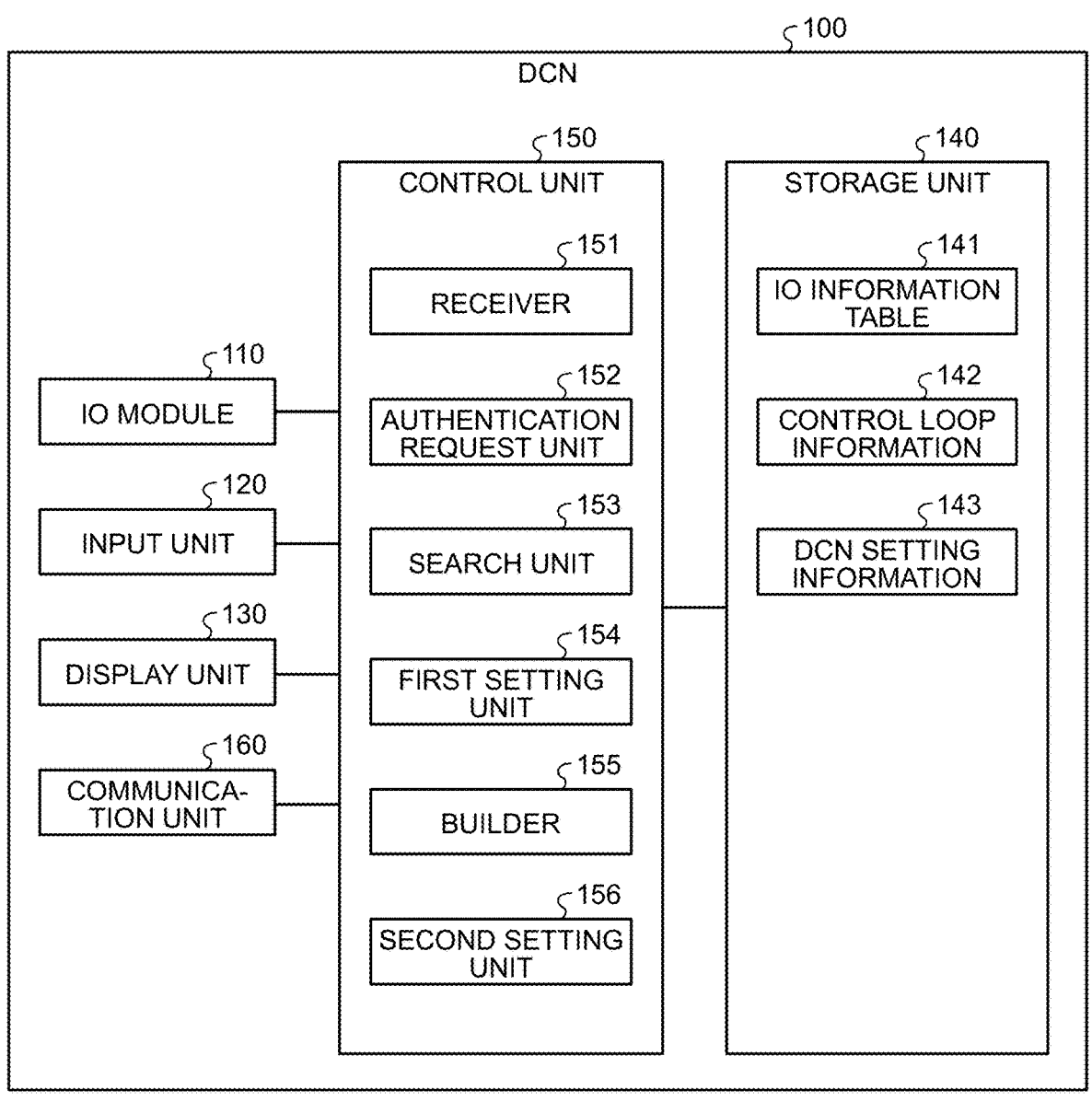
FIG. 4 is a function block diagram illustrating a functional configuration of a DCN according to an embodiment.

An example of the configuration of the DCN 100 contained in the system illustrated in FIG. 1 will be described next. FIG. 4 is a function block diagram illustrating a functional configuration of the DCN according to the embodiment. As illustrated in FIG. 4, the DCN 100 includes an IO module 110, an input unit 120, a display unit 130, a storage unit 140, a control unit 150, and a communication unit 160. The function unit that the DCN 100 includes is not limited to those illustrated in the drawing and the DCN 100 may include another function unit.

The IO module 110 includes a plurality of channels for connection to the home run cable 5, etc. For example, the DCN 100 controls the instrument 2 of the plant 1 via the IO module 110. The DCN 100 executes communication of data with the configuration management device 70 and the authentication device 80 via the communication unit 160. Note that the communication unit 160 may access to the instrumentation database 50 and the P&ID data 60.

The input unit 120 inputs various types of information to the control unit 150 of the DCN 100. The input unit 120 is a keyboard, a mouse, a touch panel, or the like. The worker operates the input unit 120 and inputs a JB number or a HR cable number.

With reference to the instrumentation database 50, the worker previously checks the relationship between the DCN 100 that is a subject of work and the junction box 4 that is connected to the DCN 100 (on what JB of what JB number is connected the DCN 100). The JB number and the HR cable number are input to the instrumentation database 50 and therefore, when a JB number is determined, an HR cable number is determined, too.

The display unit 130 displays information that is output from the control unit 150 of the DCN 100.

The storage unit 140 stores an IO information table 141, control loop information 142, and DCN setting information 143. The storage unit 140 is realized using a memory or a hard disk.

The IO information table 141 stores the IO information that is searched for from the instrumentation database 50 by the control unit 150. The IO information that is registered in the IO information table 141 is set in the IO module 110 by the control unit 150.

The control loop information 142 and the DCN setting information 143 are information that is generated using the IO information that is registered in the IO information table 141 and a result of searching the P&ID data 60.

The control unit 150 is a processor that is in charge of the entire DCN 100 and, for example, is realized using, for example, a processor, or the like. The control unit 150 includes a receiver 151, an authentication request unit 152, a search unit 153, a first setting unit 154, a builder 155, and a second setting unit 156. The first setting unit 154 and the second setting unit 156 are an example of a "setting unit".

The receiver 151 receives specification of a JB number or a HR cable number from the input unit 120. In the embodiment, the case where specification of a JB number is received from the input unit 120 will be described; however, a HR cable number may be received instead of a JB number and the same process may be performed. This is because, as described above, if a JB number is determined, an HR cable number is determined.

The receiver 151 outputs the specified JB number to the search unit 153. In the following description, the specified JB number is referred to as the "specified JB number".

When the communication unit 160 of the DCN 100 is connected to the control network 90 in the sense of hardware, the authentication request unit 152 validates a port number that is used for an authentication request among a plurality of port numbers with respect to which a program used for communication is recognized and invalidates other port numbers that are not used for the authentication request. The port number that is used for the authentication request is a port number that is used by the DCN 100 when communicating with the authentication device 80.

The authentication request unit 152 makes an authentication request to the authentication device 80. For example, the authentication request unit 152 sets identification information for identifying the DCN 100 in the authentication request. When a notification of a permission for connection is received from the authentication device 80, the authentication request unit 152 sets all necessary port numbers valid among the port numbers having been invalidated. Necessary port numbers are set previously using the setting program.

The search unit 153 acquires the specified JB number from the receiver 151 and, when the notification of a permission for connection that is made by the authentication device 80 is received, accesses the instrumentation database 50 via the configuration management device 70. The search unit 153 searches the record of the instrumentation database 50 for a record in which the same JB number as the specified JB number is set.

For example, when "JB-001" is specified as a specified JB number, the record of the item numbers (1) to (4) is hit. The search unit 153 acquires the IO information contained in the hit record from the instrumentation database 50. The search unit 153 registers the acquired IO information in the IO information table 141.

The first setting unit 154 sets a plurality of sets of IO information that are stored in the IO information table 141 in IO points (input-output channels) of the IO module 110, respectively. For example, the first setting unit 154 sets a set of IO information in an IO point.

When IO information is set in each IO point (input-output channel) of the IO module 110, the first setting unit 154 registers the channel number that is assigned to the DCN (IO channel assignment) in the DCN setting information 143.

When the number of sets of IO information stored in the IO information table 141 exceeds the number of sets of IO information that can be set in the IO points of the IO module, the first setting unit 154 sets only sets of IO information that can be set in the IO points and makes a request to make a setting relevant to the remaining IO information that cannot be set to the configuration management device 70.

On receiving the request to make a setting relevant to the remaining IO information that cannot be set from the DCN 100, the configuration management device 70 searches for another DCN in which the same JB number as that of the requesting DCN 100 is set, notifies the searched DCN of the IO information relevant to which the request has been received, and makes a request to make a setting in the IO module.

When the setting of the IO information by the first setting unit 154 ends, the builder 155 specifies the tag name of the instrument 2 contained in the IO information that is set in the IO module 110. In the following description, the tag name of the instrument 2 contained in the IO information that is set in the IO module 110 is referred to as a "set tag name".

The builder 155 accesses the P&ID data 60 via the configuration management device 70 and, based on the P&ID data 60, searches for the control loop having the same tag name of the instrument 2 as the set tag name. For example, when the set tag name is a tag name of the instrument 2-1 described using FIG. 3, the control loop is a control loop of the instrument 2-1, the function block 3-1, and the instrument 2-3.

The builder 155 generates control loop information 142 in which the tag name of the instrument 2 contained in the searched control loop, the tag name of the function block 3, an IO type (AI, AO, DI or DO) of the instrument 2 contained in the control loop, a function block type (PID, DC, or others) of the function block contained in the control loop, etc., are associated with one another and registers the control loop information 142 in the storage unit 140. For example, the function block of which function block type is "PID" is a function block that performs control (PID control) of calculating a control single based on a difference (error) between the current state of the subject to be controlled and a target state and making an adjustment. The function block of which function block type is "DC" is a functional block that deals with digital signals (DI and DO) for controlling a motor, etc.

Based on the control loop information 142 that is generated by the builder 155, the second setting unit 156 specifies the tag name of the function block contained in the control loop. The second setting unit 156 accesses the instrumentation database 50 via the configuration management device 70, acquires the control parameter and the alarm threshold corresponding to the tag name of the specified function block, and sets the control parameter and the alarm threshold in the corresponding function block 3.

Based on the control loop information 142 that is generated by the builder 155, the second setting unit 156 specifies a relationship between the channel number that is assigned to the DCN (IO channel assignment), the tag name of the function block, and the function block type and registers the relationship in the DCN setting information 143. The second setting unit 156 accesses the instrumentation database 50 via the configuration management device 70 and registers the relationship between the specified JB number and the DCN setting information 143 in the instrumentation database 50.

When the information in the instrumentation database 50 is updated and the worker wants to change the JB number that is set in the DCN 100, the worker inputs a JB number to the DCN 100 again by operating the input unit 120. When a new specified JB number is received from the input unit 120, each of the function units 151 to 156 that are contained in the control unit 150 initializes the IO information table 141, the control loop information 142, and the DCN setting information 143 and executes the above-described process again. Accordingly, IO information corresponding to the new specified JB number is searched for and the searched IO information is set in each IO point of the IO module 110. The control loop information 142 and the DCN setting information 143 corresponding to the new specified JB number are generated again.

When connected to a dynamic process simulation, the DCN 100 executes a function test on the function block 3 and outputs a test report.

Flow of Process

A flow of a process performed by the DCN 100 according to the embodiment will be described next. FIG. 5 is a flowchart illustrating the flow of the process performed by a DCN of the embodiment. As illustrated in FIG. 5, the receiver 151 of the DCN 100 receives an input of a JB number from the input unit 120 (step S101).

When a connection to the control network is made, the authentication request unit 152 of the DCN 100 invalidates port numbers excluding the port number that is used for an authentication request among a plurality of port numbers (step S102). The authentication request unit 152 transmits an authentication request to the authentication device 80 (step S103). When a notification of a connection permission is received from the authentication device 80, the authentication request unit 152 sets all necessary port numbers valid (step S104).

The search unit 153 of the DCN 100 accesses the instrumentation database 50 via the configuration management device 70, searches for IO information corresponding to the JB number, and registers the searched IO information in the IO information table 141 (step S105).

The first setting unit 154 of the DCN 100 sets a plurality of sets of IO information that are registered in the IO information table 141 in each OP point of the IO module 110 (step S106). When the number of sets of IO information stored in the IO information table 141 exceeds the number of sets of IO information that can be set, the first setting unit 154 makes a request to make a setting relevant to the IO information that cannot be set to the configuration management device (step S107).

Based on the result of assigning the IO information to each IO point of the IO module 110, the first setting unit 154 generates the DCN setting information 143 (step S108).

The builder 155 of the DCN 100 specifies the tag name (set tag name) of the instrument 2 contained in the IO information that is set in the IO module 110 (step S109). The builder 155 accesses the P&ID data 60 via the configuration management device 70, searches for a control loop having the same tag name of the instrument 2 as the set tag name, and generates the control loop information 142 (step S110).

Based on the control loop information 142, the second setting unit 156 of the DCN 100 specifies the tag name of the function block 3 contained in the control loop (step S111). The second setting unit 152 accesses the instrumentation database 50 via the configuration management device 70 and acquires the control parameter and the alarm threshold corresponding to the specified tag name of the function block 3 (step S112).

The second setting unit 156 sets the control parameter and the alarm threshold that are acquired in the function block (step S113). Based on the control loop information 142, the second setting unit 156 specifies the relationship between the channel number that is assigned to the DCN 100, the tag name of the function block 3, and the function block type and registers the relationship in the DCN setting information 143 (step S114).

When connected to a dynamic process simulation, the DCN 100 executes a function test and outputs a test report (step S115).

The second setting unit 156 accesses the instrumentation database 50 via the configuration management device 70 and registers the relationship between the specified JB number and the DCN setting information 143 in the instrumentation database 50 (step S116).

Effect

The effect of the DCN 100 according to the embodiment will be described. On receiving specification of a JB number (or a HR cable number), the DCN 100 accesses the instrumentation database 50, searches for IO information corresponding to the specified JB number, and sets the searched IO information in the IO module. Accordingly, only setting a JB number in the DCN 100 by the worker automatically sets IO information in the IO module, which makes it possible to eliminate the load due to engineering performed manually by the worker conventionally.

When connected the control network 90, the DCN 100 invalidates port numbers excluding the port number on which an authentication request is made, makes an authentication request relevant to connection to the authentication device 80 and, when the authentication device 80 permits the connection, validates the invalidated port numbers. Accordingly, only the authenticated DCN can be connected to the control network 90, which makes it possible to increase the security level.

The DCN 100 builds a control loop based on the searched IO information and the P&ID data 60. The worker thus is able to generate a basic control loop by only setting a JB number in the DCN 100.

When the number of sets of IO information that are searched for exceeds the number of sets of IO information that can be set in the IO module, the DCN 100 executes making a request to set the excess of sets of IO information to the configuration management device 70. It is thus possible to divide setting the IO information.

The DCN 100 records information on setting the IO information in the IO module 110 as the DCN setting information 143 and sets the information in the instrumentation database 50. It is thus possible to automatically set allocation of the IO information that is set automatically on the side of the DCNs in the instrumentation database 50.

Hardware

Figure 6:
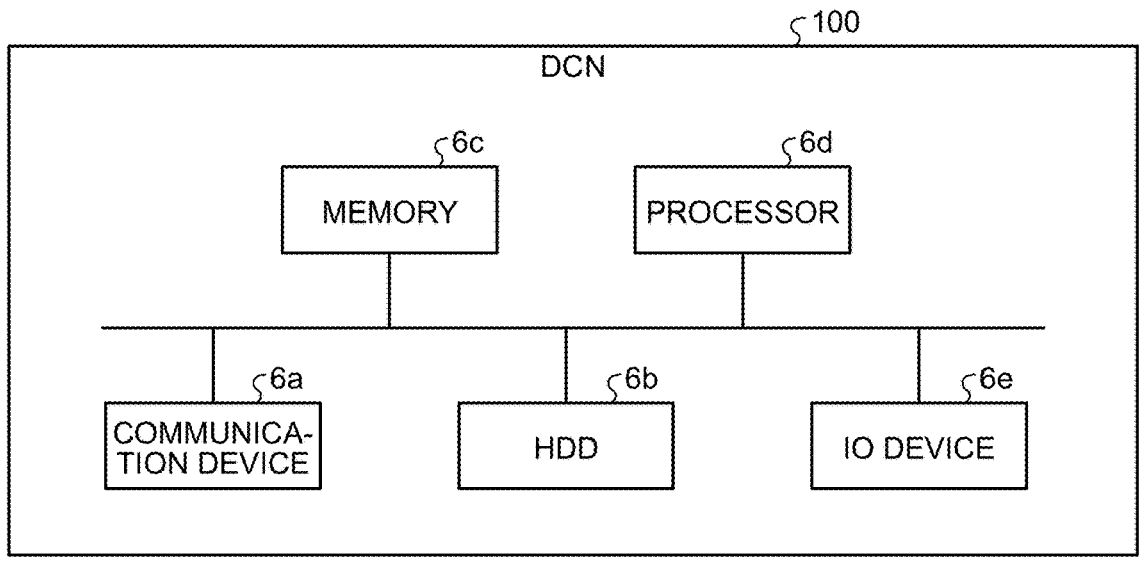
FIG. 6 is a diagram illustrating a hardware configuration.

An example of a hardware configuration of the DCN 100 will be described next. FIG. 6 is a diagram illustrating the example of the hardware configuration. As illustrated in FIG. 6, the DCN 100 includes a communication device 6a, a hard disk drive (HDD) 6b, a memory 6c, a processor 6d, and an IO device 6e. The units illustrated in FIG. 6 are mutually connected via a bus, or the like.

The communication device 6a communicates with the configuration management device 70, the authentication device 80, other servers, and field instruments having a communicating function. The IO device 6e is an IO module, or the like, and the home run cable 5 is connected to the IO device 6e. The HDD 6b stores a program that causes the functions illustrated in FIG. 4 to run.

The processor 6d reads the program for executing the same process as that performed by each of the processors illustrated in FIG. 4 from the HDD 6b, or the like, and loads the program into the memory 6c, thereby causing the process of implementing each of the functions illustrated in FIG. 4, etc., to run. For example, the process executes the same functions as those of the respective processors that the DCN 100 includes. Specifically, the processor 6d executes a process of executing the same processes as those performed by the receiver 151, the authentication request unit 152, the search unit 153, the first setting unit 154, the builder 155, and the second setting unit 156.

As described above, by reading and executing the program, the DCN 100 operates as a DCN that executes the setting method. The DCN 100 reads the above-described program from a recording medium using a medium read device and executes the read program, thereby implementing the same functions as those of the above-described embodiment. A program according to another embodiment is not limited to being executed by the DCN 100. For example, the disclosure may be similarly applied to the case where another computer or another server executes the program and also to the case where the computer and the server execute the program cooperatively.

The program can be distributed via a network, such as the Internet. The program is recorded in a computer-readable recording medium, such as a hard disk, a flexible disk (FD), a CD-ROM, a magneto-optical disk (MO), or a digital versatile disc (DVD), and is executable by being read by a computer from the recording medium.

Others

Some examples of a combination of the disclosed technical characteristics will be described below.

(1) A controller comprising:

a receiver that receives specification of identification information representing a number that identifies a relay device that is connected to a plurality of instruments or a number that identifies a cable that connects the relay device and the controller;

a search unit that searches an instrumentation database that records the identification information and input-output information on the instruments that are connected to the relay device in association with each other for input-output information corresponding to the specified identification information; and a setting unit that sets the searched input-output information in an input-output module of the controller.

(2) The controller according to (1), further comprising an authentication request unit that executes a process of, when a connection to a control network for accessing to the instrumentation database is made, invaliding port numbers excluding a port number on which an authentication request is made and making an authentication request relevant to connection to an authentication device and, when the authentication device permits connection, executing a process of validating the invalidated port numbers.

(3) The controller according to (1) or (2), further comprising a builder that, based on information that defines a connection relationship between the instruments that are set in a plant and a function block that is connected to the instruments and the input-output information that is searched for by the search unit, specifies a function block that is connected to an instrument corresponding to the input-output information, and builds a control loop that associates the instrument and the function block, wherein the setting unit sets a control parameter and an alarm threshold in the function block.

(4) The controller according to (1), (2) or (3), wherein, when the number of instruments corresponding to the input-output information exceeds an upper limit that is set in the input-output module, the setting unit further executes a process of requesting a management device of a system to set input-output information relevant to instruments exceeding the upper limit in number.

(5) The controller according to (1), wherein, when the input-output information is set in the input-output module, the setting unit further executes a process of recording a relationship between a channel of the controller and the input-output information as setting information and setting the setting information in the instrumentation database.

(6) The controller according to any one of (1) to (4) wherein the receiver receives specification of identification information representing a number that identifies a junction box that is connected to a plurality of instruments that are used to operate a plant or a number that identifies a cable that connects the junction box and the controller;

the search unit searches instrumentation database that records identification information and input-output information on a plurality of instruments that are connected to the junction box in association with each other for input-output information corresponding to the specified identification information; and the setting unit sets the searched input-output information in the input-output module of the controller.

(7) A setting method performed by a computer to execute a process comprising:

receiving specification of identification information representing a number that identifies a relay device that is connected to a plurality of instruments or a number that identifies a cable that connects the relay device and the computer;

searching an instrumentation database that records the identification information and input-output information on the instruments that are connected to the relay device in association with each other for input-output information corresponding to the specified identification information; and setting the searched input-output information in an input-output module of the computer.

(8) A non-transitory computer-readable recording medium having stored therein a setting program that causes a computer to execute a process comprising:

receiving specification of identification information representing a number that identifies a relay device that is connected to a plurality of instruments or a number that identifies a cable that connects the relay device and the computer;

searching an instrumentation database that records the identification information and input-output information on the instruments that are connected to the relay device in association with each other for input-output information corresponding to the specified identification information; and setting the searched input-output information in an input-output module of the computer.

According to the embodiment, it is possible to perform engineering on an automation system efficiently.

What is claimed is:

1. A controller comprising:

function blocks that acquire information from one of a plurality of instruments that are set in a plant and control another of the plurality of instruments based on the acquired information, to form each control loop;

a receiver that receives specification of identification information representing a number that identifies a relay device that is connected to the plurality of instruments or a number that identifies a cable that connects the relay device and the controller;

a search unit that searches an instrumentation database that records the identification information and input-output information on the instruments that are connected to the relay device in association with each other for input-output information corresponding to the specified identification information;

a setting unit that sets the searched input-output information in an input-output module of the controller; and a builder that specifies a function block among the function blocks that is connected to an instrument corresponding to the input-output information based on information that defines a connection relationship between the instruments and the function block and the input-output information that is searched for by the search unit, and builds the control loop that associates the instrument and the function block.

2. The controller according to claim 1, further comprising an authentication request unit that executes a process of, when a connection to a control network for accessing to the instrumentation database is made, invaliding port numbers excluding a port number on which an authentication request is made and making an authentication request relevant to connection to an authentication device and, when the authentication device permits connection, executing a process of validating the invalidated port numbers.

3. The controller according to claim 1, wherein the setting unit sets a control parameter and an alarm threshold in the function block.

4. The controller according to claim 1, wherein, when the number of instruments corresponding to the input-output information exceeds an upper limit that is set in the input-output module, the setting unit further executes a process of requesting a management device of a system to set input-output information relevant to instruments exceeding the upper limit in number.

5. The controller according to claim 1, wherein, when the input-output information is set in the input-output module, the setting unit further executes a process of recording a relationship between a channel of the controller and the input-output information as setting information and setting the setting information in the instrumentation database.

6. A setting method performed by a computer to execute a process comprising:

building function blocks that acquire information from one of a plurality of instruments that are set in a plant and control another of the plurality of instruments based on the acquired information, to form each control loop;

receiving specification of identification information representing a number that identifies a relay device that is connected to a plurality of instruments or a number that identifies a cable that connects the relay device and the computer;

searching an instrumentation database that records the identification information and input-output information on the instruments that are connected to the relay device in association with each other for input-output information corresponding to the specified identification information;

setting the searched input-output information in an input-output module of the computer;

specifying a function block among the function blocks that is connected to an instrument corresponding to the input-output information based on information that defines a connection relationship between the instruments and the function block and the input-output information that is searched for by the searching; and building the control loop that associates the instrument and the function block.

7. A non-transitory computer-readable recording medium having stored therein a setting program that causes a computer to execute a process comprising:

building function blocks that acquire information from one of a plurality of instruments that are set in a plant and control another of the plurality of instruments based on the acquired information, to form each control loop;

receiving specification of identification information representing a number that identifies a relay device that is connected to a plurality of instruments or a number that identifies a cable that connects the relay device and the computer;

searching an instrumentation database that records the identification information and input-output information on the instruments that are connected to the relay device in association with each other for input-output information corresponding to the specified identification information; and setting the searched input-output information in an input-output module of the computer;

specifying a function block among the function blocks that is connected to an instrument corresponding to the input-output information based on information that defines a connection relationship between the instruments and the function block and the input-output information that is searched for by the searching; and building the control loop that associates the instrument and the function block.

8. The controller according to claim 1, wherein the control loop includes a flow in which the function block acquires the information from one of the plurality of instruments and controls another of the plurality of instruments based on the acquired information.

* * * * *